United States Patent
Chiang et al.

(10) Patent No.: US 6,871,915 B2
(45) Date of Patent: Mar. 29, 2005

(54) MULTIPLE-FLANGE BICYCLE HUBS

(76) Inventors: Cheng-Hsun Chiang, No. 487, Ko-Chung Rd., Ta-Li City, Taichung Hsien (TW); Eric Alan Hjertberg, No. 487, Ko-Chung Rd., Ta-Li City, Taichung Hsien (TW)

(*) Notice: Subject to any disclaimer, the term of this patent is extended or adjusted under 35 U.S.C. 154(b) by 0 days.

(21) Appl. No.: 10/428,821

(22) Filed: May 5, 2003

(65) Prior Publication Data

US 2004/0222692 A1 Nov. 11, 2004

(51) Int. Cl.⁷ ................................................ B60B 1/02
(52) U.S. Cl. ...................... 301/55; 301/104; 301/110.5
(58) Field of Search ............................. 301/54, 55, 56, 301/59, 110.5, 104

(56) References Cited

U.S. PATENT DOCUMENTS

| | | | | |
|---|---|---|---|---|
| 459,699 A | * | 9/1891 | Duryea | 301/55 |
| 573,635 A | * | 12/1896 | Aze | 301/56 |
| 574,538 A | * | 1/1897 | Hammon | 301/56 |
| 614,283 A | * | 11/1898 | Barnett, Jr. | 301/56 |
| 614,284 A | * | 11/1898 | Barnett | 301/56 |
| 742,503 A | * | 10/1903 | Seeds | 301/55 |
| 5,931,544 A | * | 8/1999 | Dietrich | 301/58 |

FOREIGN PATENT DOCUMENTS

| | | | |
|---|---|---|---|
| FR | 759551 | * | 2/1934 |
| GB | 5433 | * | 11/1883 |
| GB | 32441 | * | 9/1897 |

* cited by examiner

Primary Examiner—Russell D. Stormer

(57) ABSTRACT

A bicycle hub includes a tubular body and a first flange, a second flange and a third flange extend radially from an outer surface of the tubular body. The third flange is located between the first flange and the second flange. Each of the first flange, the second flange and the third flange has holes defined therethrough so as to be connected with spokes. The diameter of the three flanges and the radial distance of the holes in the three flanges may be different so as to obtain a desired rim according to the way of use of the bicycle wheel.

2 Claims, 11 Drawing Sheets

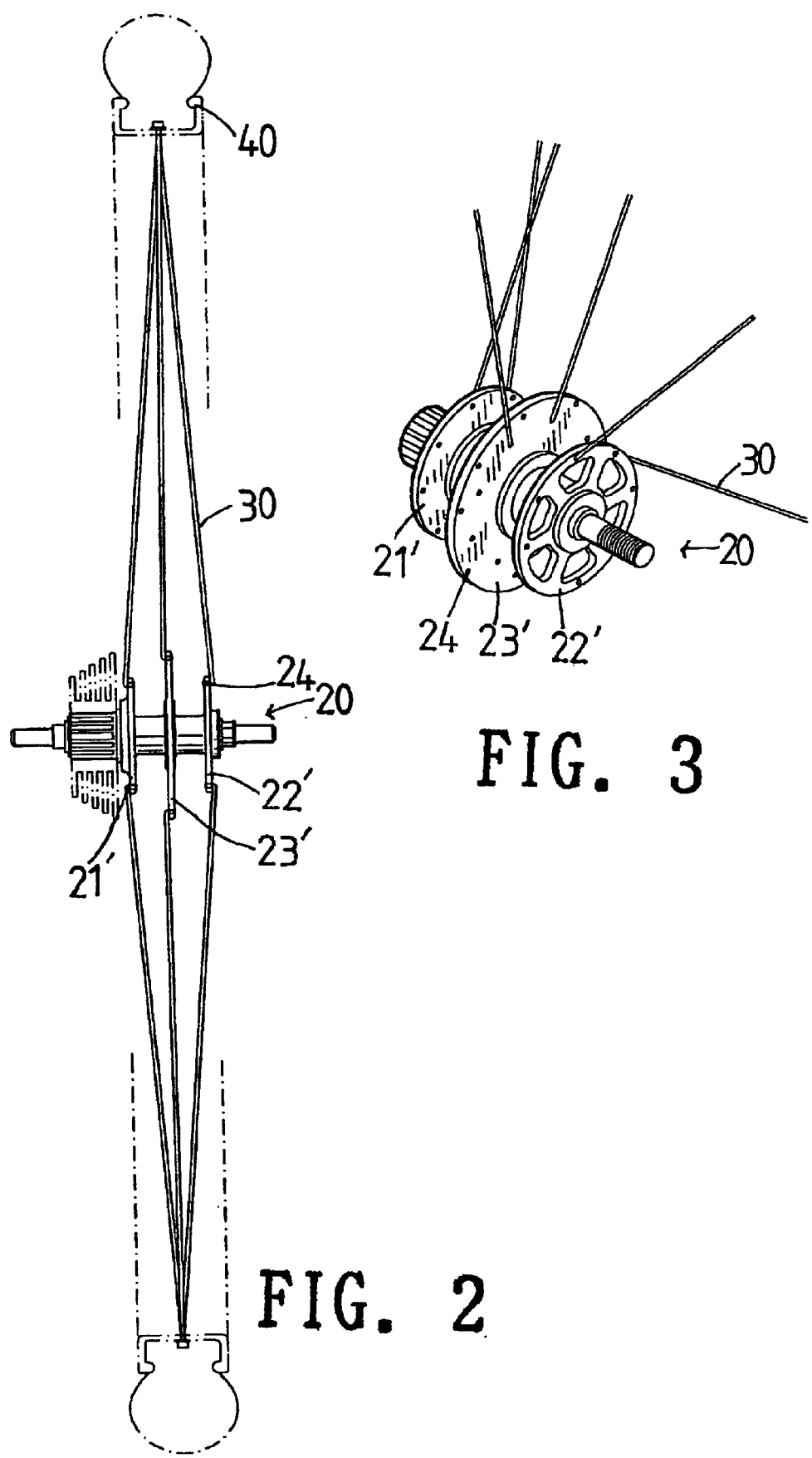

MULTIPLE-FLANGE BICYCLE HUBS

FIELD OF THE INVENTION

The present invention relates to a bicycle hub with multiple flanges and each flange is connected with spokes so as to provide a strong bicycle rim.

BACKGROUND OF THE INVENTION

A conventional bicycle hub 10 is shown in FIGS. 14 and 15 and generally includes two flanges 11, 12 each of the two flanges 11, 12 has holes 13 so as to be connected with spokes 14. The spokes 14 can be connected between the flanges 11, 12 and the rim in straight form or in a cross form which is depended upon the way of use of the wheels. The more the number of the spokes is, the larger the air friction of the wheel is suffered. If the number of the spokes is reduced or the diameter of the spokes is reduced, the rim will be weaker. The stress that is applied to the spokes is concentrated to the two flanges so that the two flanges are more likely to be deformed or the spokes tend to be deformed when the rim is applied by a severe impact. The spokes affect the rim which could be deformed if the spokes are deformed or broken. Once the rim is deformed, the brake function is negatively affected.

The present invention intends to provide a bicycle hub which includes at least three flanges so as to provide enough number of spokes.

SUMMARY OF THE INVENTION

In accordance with one aspect of the present invention, there is provided a combination of a bicycle hub and spokes, wherein the hub includes a tubular body and a first flange, a second flange and a third flange extend radially from an outer surface of the tubular body. The third flange is located between the first flange and the second flange. Each of the first flange, the second flange and the third flange has holes defined therethrough so as to be connected with spokes.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 2 shows an end view of the combination of an embodiment of the hub, the spokes and the rim;

FIG. 3 is a perspective view to show a part of the combination in FIG. 2 of the hub and the spokes;

DETAILED DESCRIPTION OF THE PREFERRED EMBODIMENT

Figure 1:
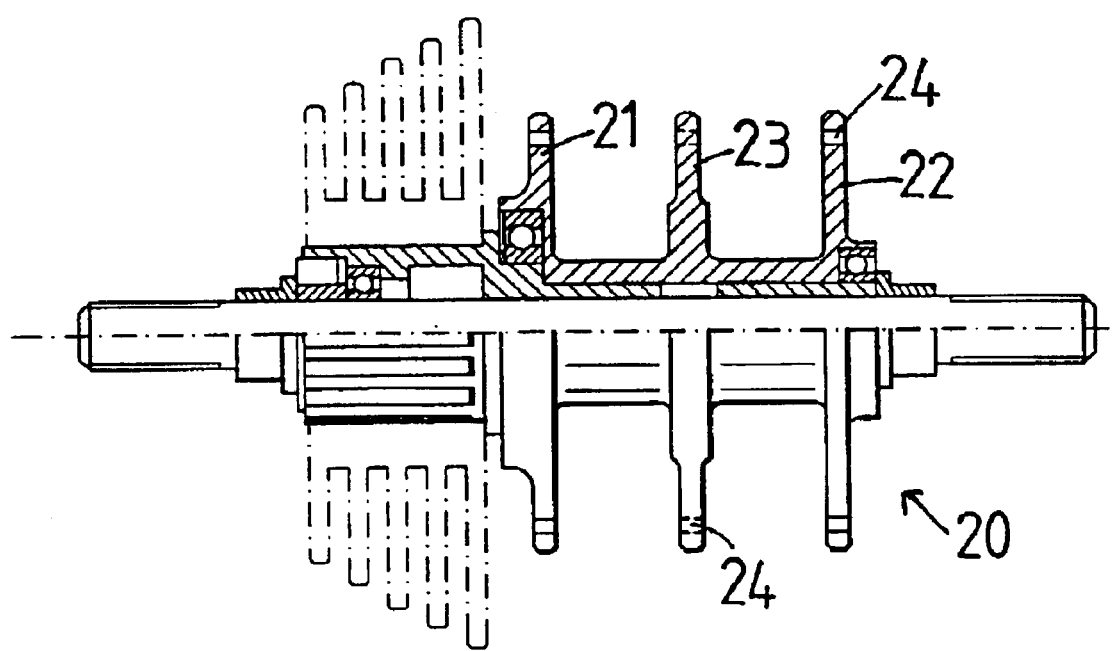
FIG. 1 is a cross sectional view to show the hub of the present invention.

Referring to FIG. 1, the hub 20 of the present invention comprises a tubular body and a first flange 21, a second flange 22 and a third flange 23 extend radially from an outer surface of the tubular body. The third flange 23 is located between the first flange 21 and the second flange 22. Each of the first flange 21, the second flange 22 and the third flange 23 has holes 24 defined therethrough so as to be connected with spokes 30 which are connected to a rim 40. In this embodiment as shown in FIGS. 2 and 3, the third flange 23' is larger than that of the first flange 21' and the second flange 22'.

Figures 4, 5:
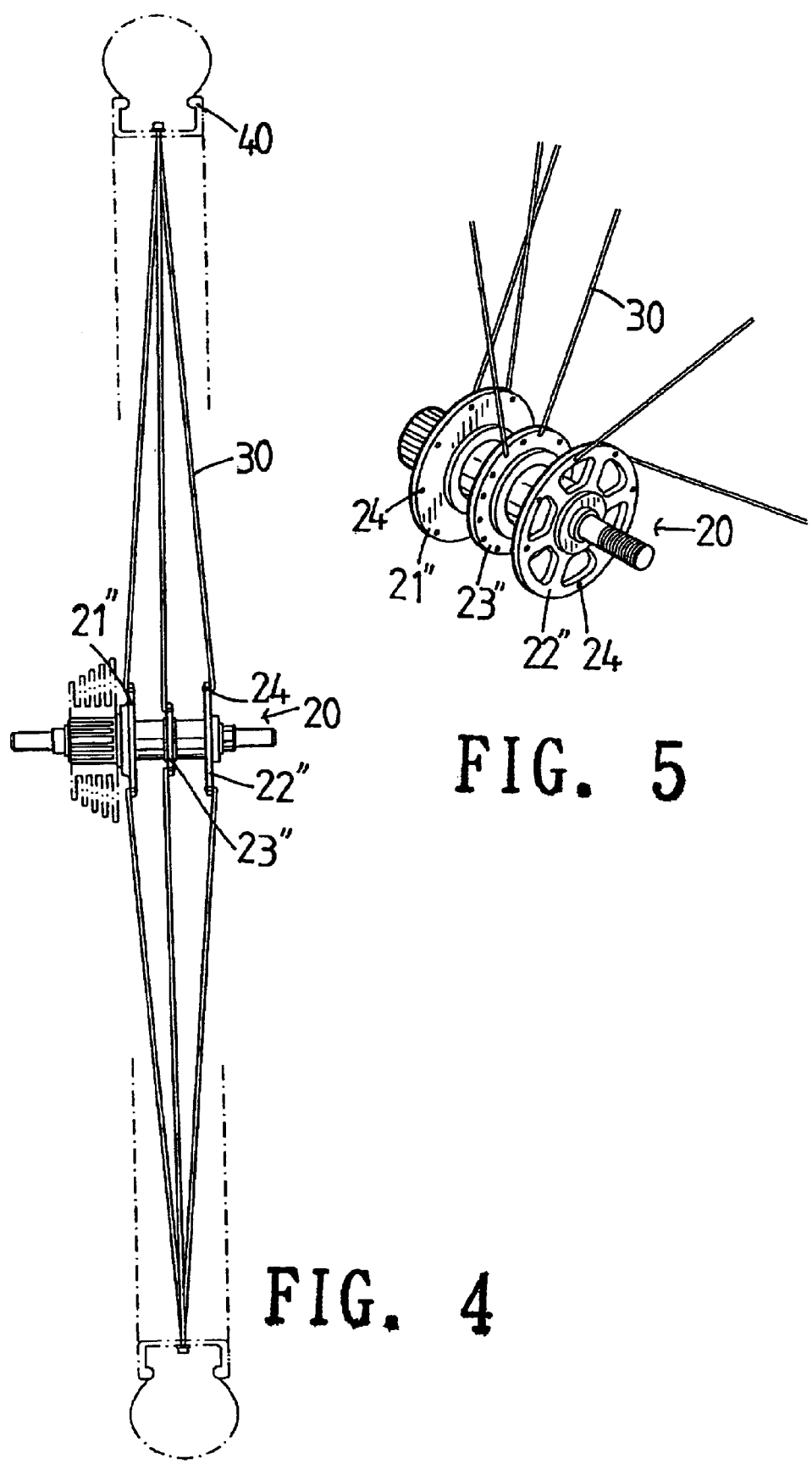
FIG. 4 shows the third flange is smaller than the other two flanges.
FIG. 5 shows a perspective view of a part of the combination of the hub and the spokes in FIG. 4.
Figures 6, 7:
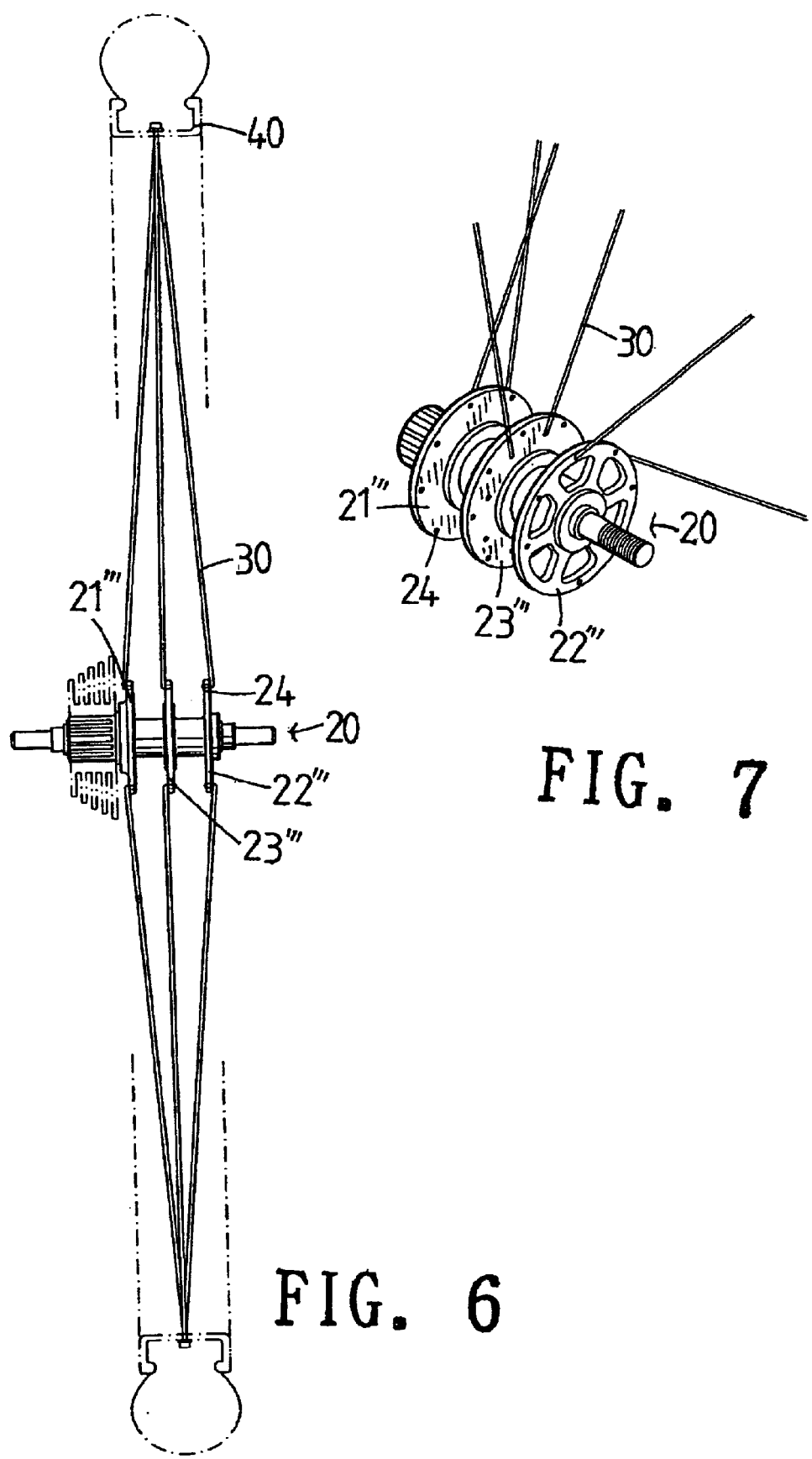
FIG. 6 shows the three flanges are the same size.
FIG. 7 shows a perspective view of a part of the combination of the hub and the spokes in FIG. 6.

FIGS. 4 and 5 show that the third flange 23" is smaller than the first flange 21" and the second flange 22". The different diameters of the three flanges 21", 22", 23" allow different lengths of the spokes 30 which may provide different functions for the wheel. FIGS. 6 and 7 show that the three flanges 21''', 22''' and 23''' are the same size.

Figure 8:
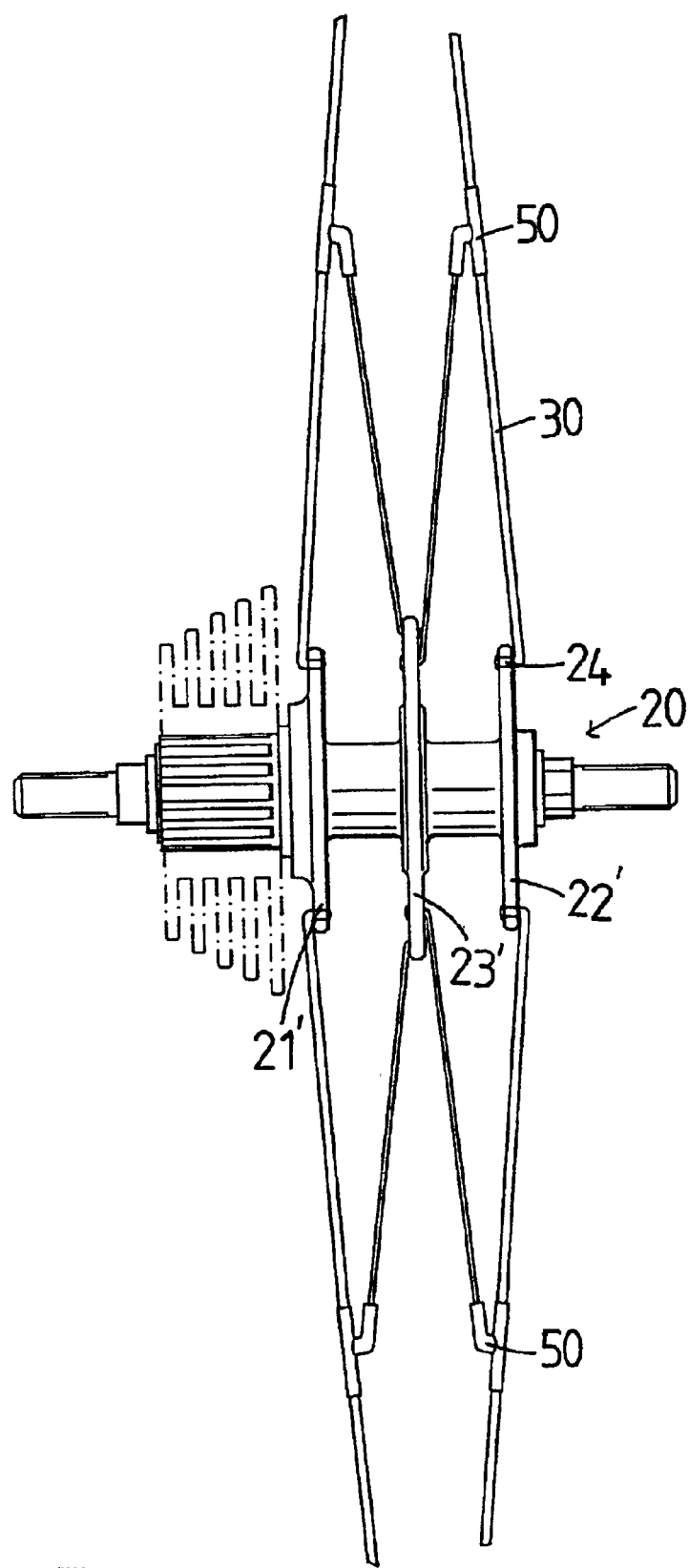
FIG. 8 shows an embodiment of the connection between the spokes of the three flanges.
Figure 9:
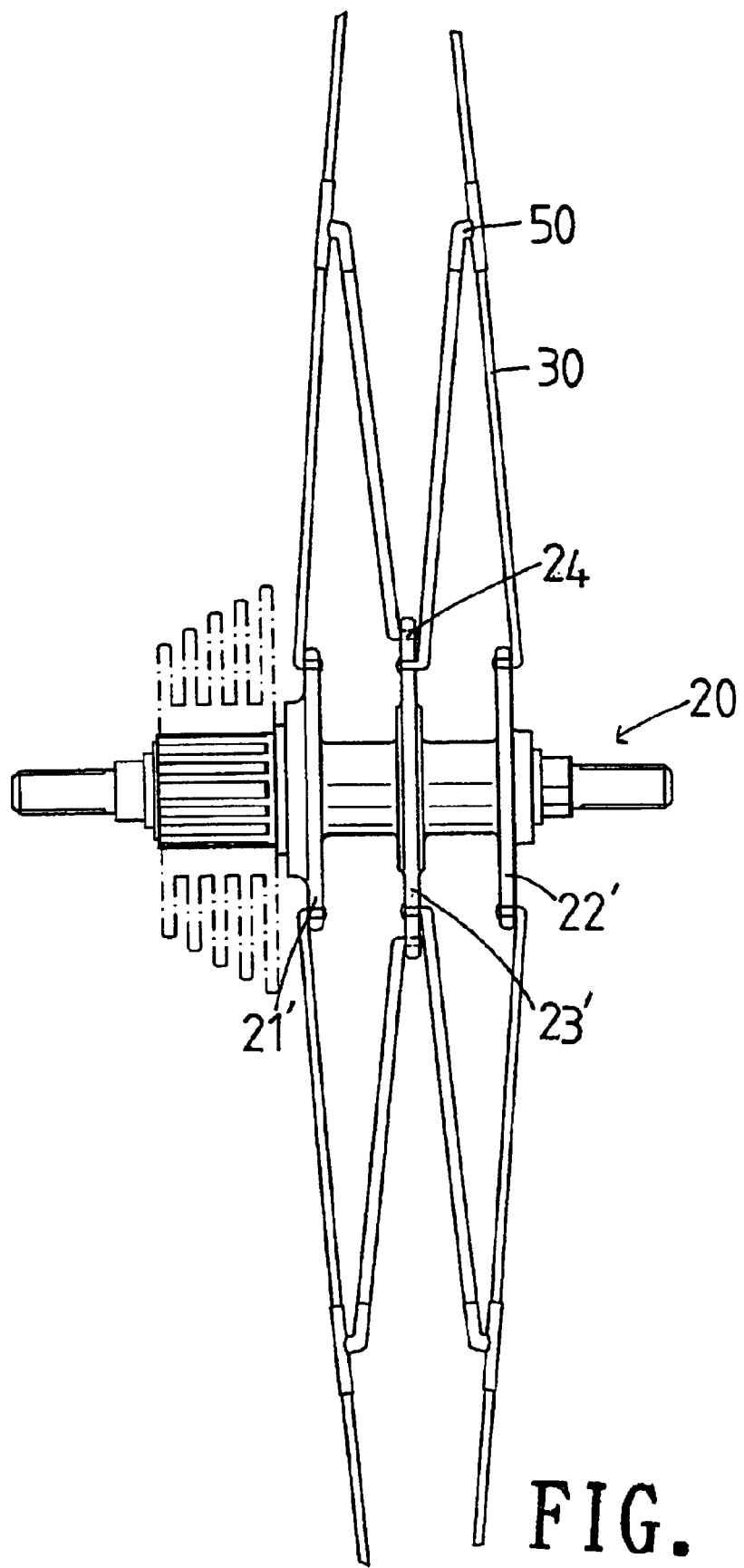
FIG. 9 shows another view of the embodiment as shown in FIG. 8.
Figure 10:
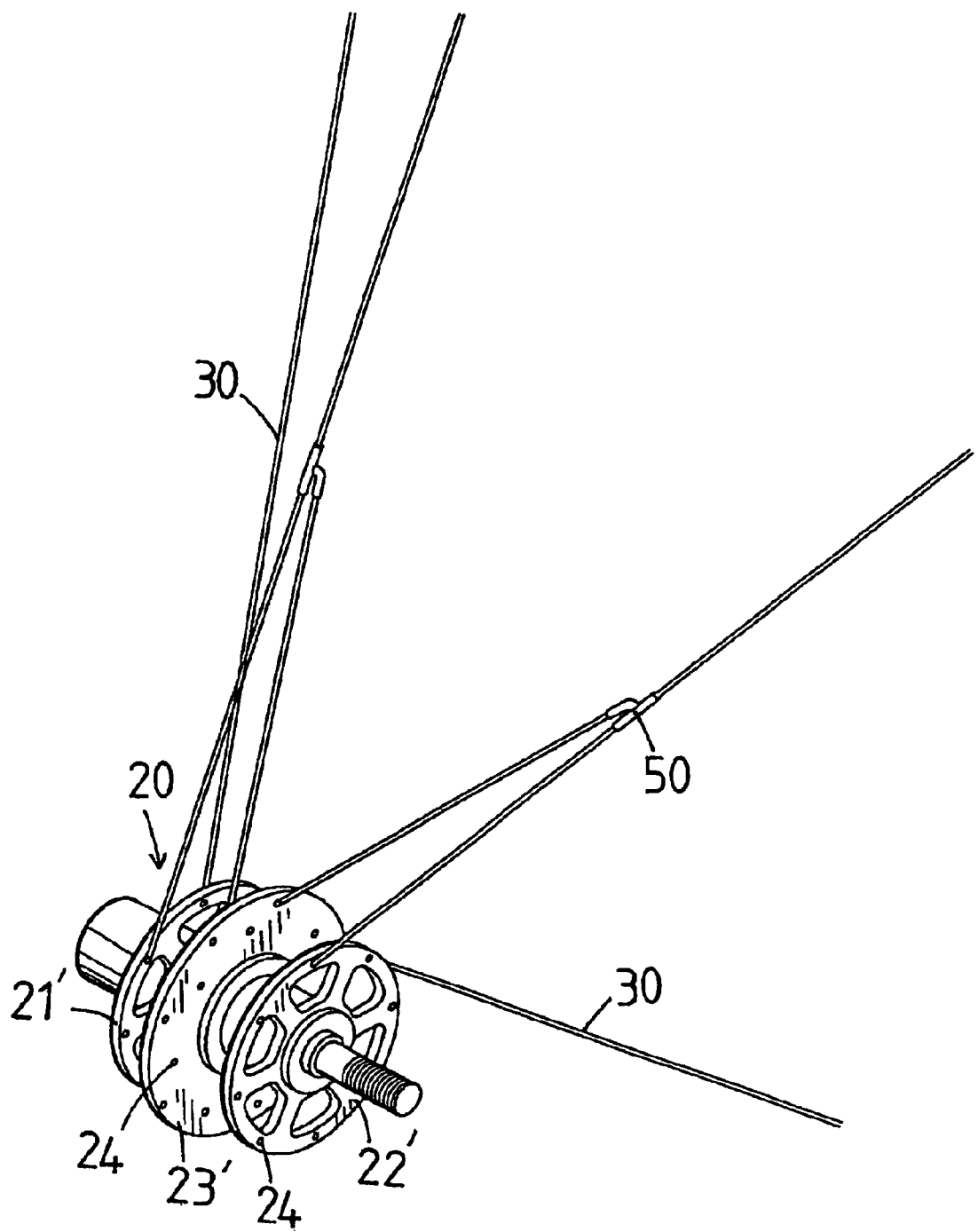
FIG. 10 is a perspective view to show the connection between the spokes of the three flanges as shown in FIG. 8.
Figure 11:
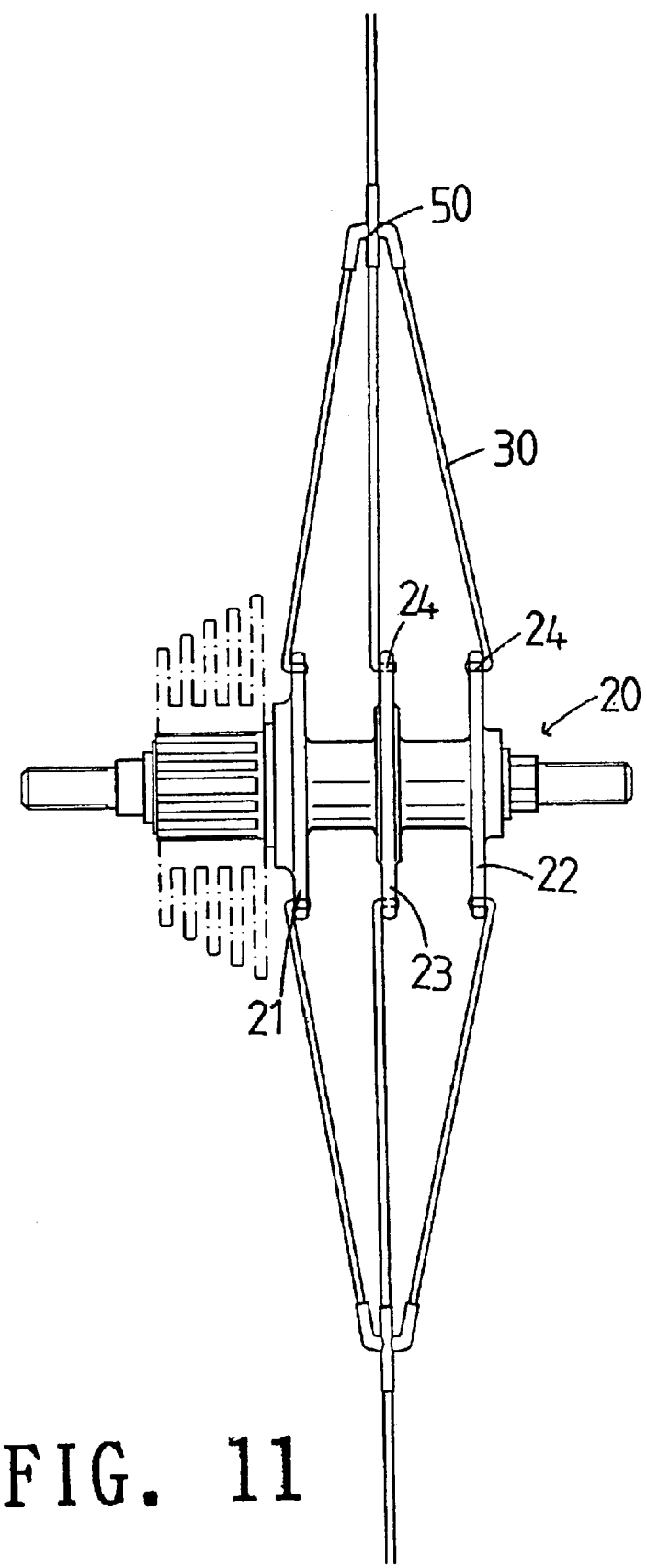
FIG. 11 shows yet another embodiment of the connection between the spokes of the three flanges.

FIGS. 8 to 10 show that a connector 50 is mounted to each of the spokes 30 that are connected with the first flange 21' and the second flange 22'. The spokes 30 connected to the third flange 23' are connected to the connectors 50 on the spokes 30 on the first flange 21' and the second flange 22'. By this way, the arrangement between the spokes 30 may vary according to practical needs so as to provide enough torque. FIG. 11 shows that a connector 50 mounted to each of the spokes 30 connected with the third flange 23. The spokes 30 connected to the first flange 21 and the second flange 22 are respectively connected to the connectors 50 on the spokes on the third flange 23.

Figures 12, 13:
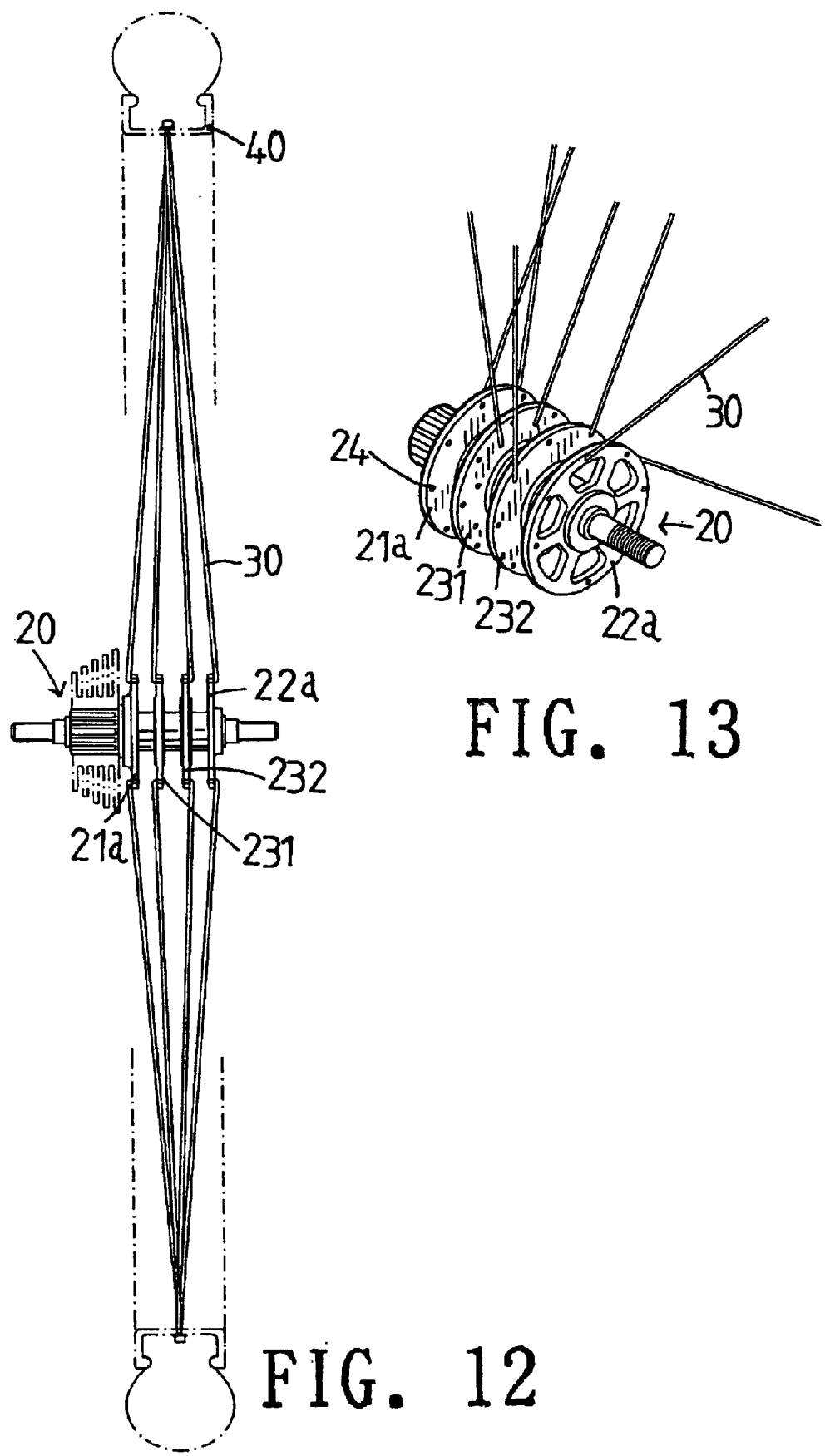
FIG. 12 shows the hub has four flanges.
FIG. 13 shows a perspective view of the hub with four flanges.
Figure 14:
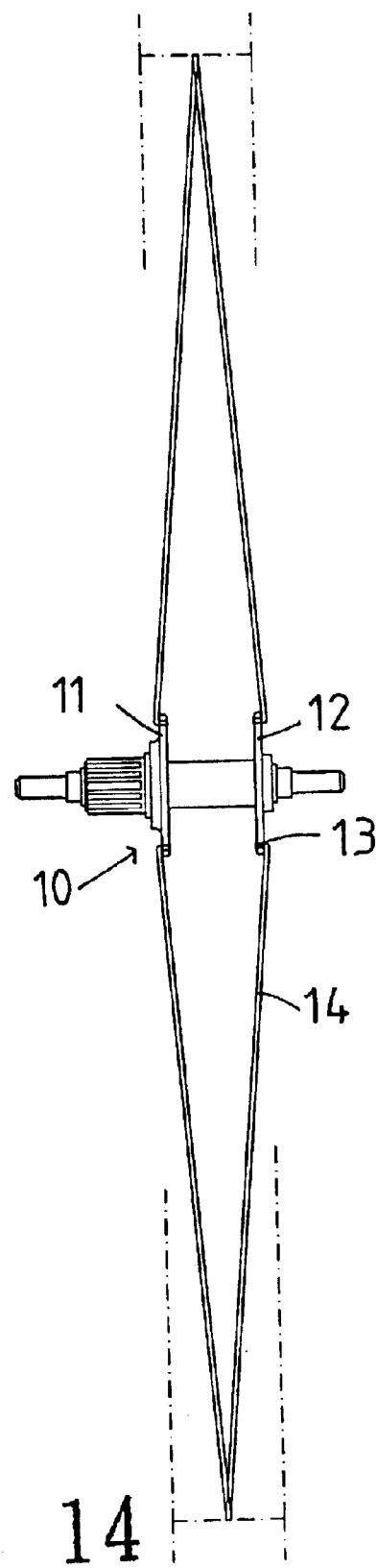
FIG. 14 shows an end view of a conventional hub and the spokes.
Figure 15:
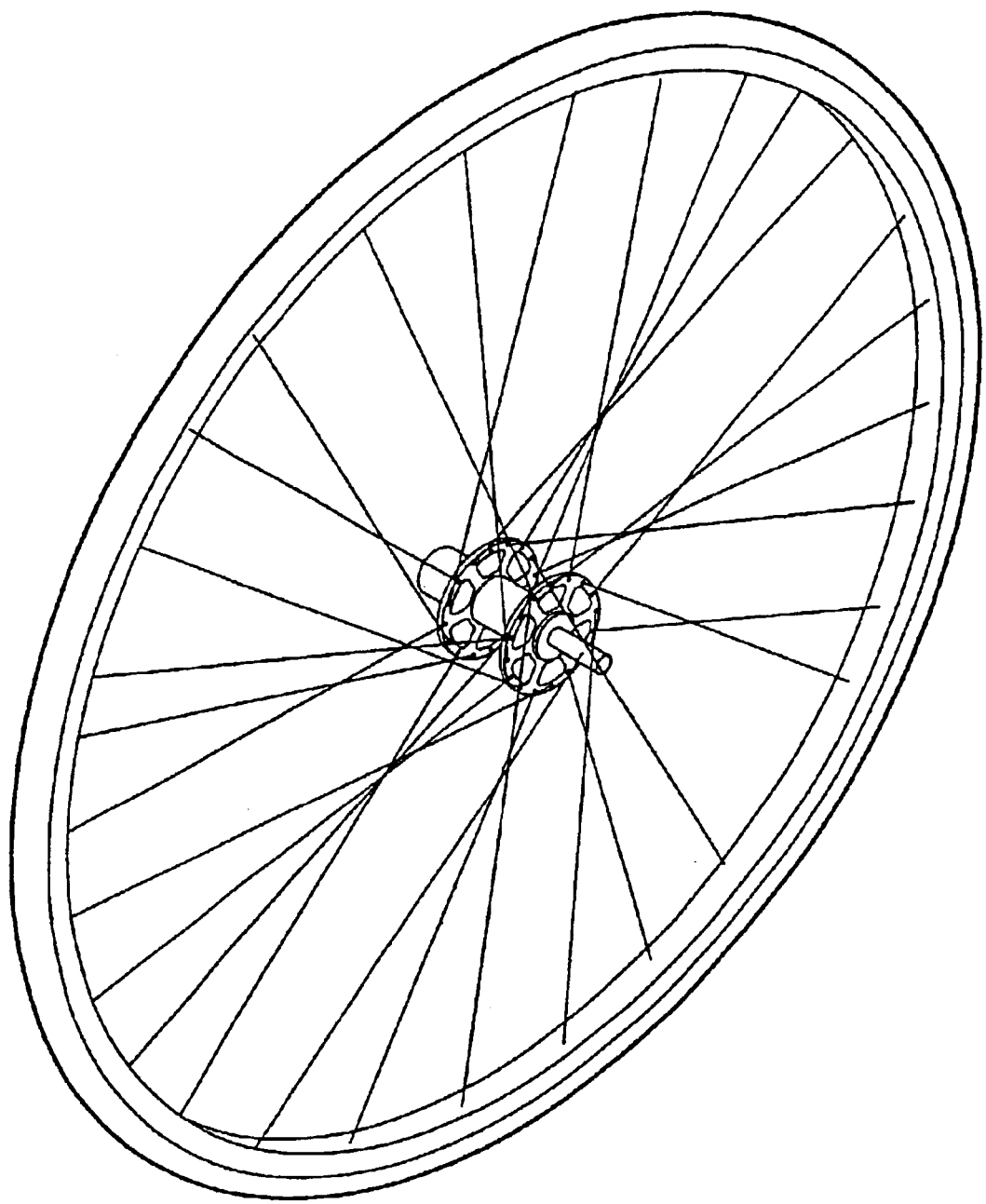
FIG. 15 shows a perspective view of a wheel with the conventional hub.

FIGS. 12 and 13 show that the number of the flange can be four which are the first flange 21a, the second flange 22a, the third flange 231 and the fourth flange 232.

While we have shown and described the embodiment in accordance with the present invention, it should be clear to those skilled in the art that further embodiments may be made without departing from the scope of the present invention.

What is claimed is:

1. A combination of a bicycle hub and spokes, comprising:

a tubular body and a first flange, a second flange and a third flange extending radially from an outer surface of the tubular body, the third flange located between the first flange and the second flange, each of the first flange, the second flange and the third flange having holes defined therethrough so as to be connected with spokes, a diameter of the third flange being different from a diameter of each of the first flange and the second flange, and a connector mounted to each of the spokes connected with the first flange and the second flange, the spokes connected to the third flange connected to the connectors on the spokes on the first flange and the second flange.

2. A combination of a bicycle hub and spokes, comprising:

a tubular body and a first flange, a second flange and a third flange extending radially from an outer surface of the tubular body, the third flange located between the first flange and the second flange, each of the first flange, the second flange and the third flange having holes defined therethrough so as to be connected with spokes, a diameter of the third flange being different from a diameter of each of the first flange and the second flange, and a connector mounted to each of the spokes connected with the third flange, the spokes connected to the first flange and the second flange respectively connected to the connectors on the spokes on the third flange.

* * * * *